Nov. 3, 1970  KAZUO ASO  3,537,191

DRIVING SKILL TESTING APPARATUS

Filed Oct. 21, 1968  8 Sheets-Sheet 2

Nov. 3, 1970         KAZUO ASO         3,537,191

DRIVING SKILL TESTING APPARATUS

Filed Oct. 21, 1968         8 Sheets-Sheet 4

FIG. 5a

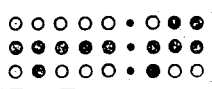
SET TO START
READY FOR INITIATION OF DETERMINATION
RESET SLOPE

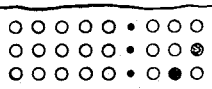
NOT INSTRUCT
OPERATE LEFT INDICATOR
OPERATE RIGHT INDICATOR

STEER STRAIGHT
STEER LEFT OR RIGHT 46°-90°
STEER LEFT OR RIGHT ABOVE 90°

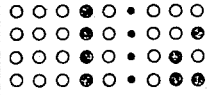
SHIFT TO NEUTRAL
SHIFT TO LOW
SHIFT TO SECOND
SHIFT TO HIGH
SHIFT REVERSELY

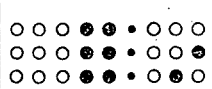
NOT DEPRESS BRAKE
DEPRESS BRAKE
FULLY DEPRESS BRAKE

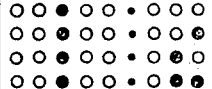
STOP 0-2 km/h (0-2ml/h)
LOW SPEED I 0-15km/h (0-10ml/h)
LOW SPEED II 2-30km/h (0-2ml/h)
MODERATE SPEED I 15-45km/h (10-30ml/h)
MODERATE SPEED II 30-60km/h (20-40ml/h)
MODERATE SPEED III 45-75km/h (30-50ml/h)
HIGH SPEED I 60-90km/h (40-60ml/h)
HIGH SPEED II 75-105km/h (50-70ml/h)

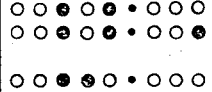
NOT DEPRESS ACCELERATOR
DEPRESS ACCELERATOR

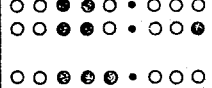
NOT DEPRESS CLUTCH
DEPRESS CLUTCH

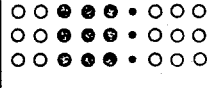
NOT TURN ON HEAD LIGHT
TURN ON HEAD LIGHT
DIM HEAD LIGHT
RELEASE HAND BRAKE
USE HAND BRAKE

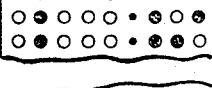
HORIZONTAL ROAD
ASCENT
DESCENT

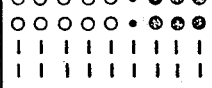
1ST TAPE TRANSPORTATION
2ND TAPE TRANSPORTATION

N-1th TAPE TRANSPORTATION
Nth TAPE TRANSPORTATION
Nth TAPE TRANSPORTATION

N+5th TAPE TRANSPORTATION
SET TO START

MANUALLY SET TO START

FIG. 5b

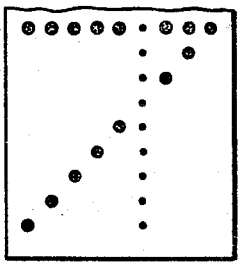

Fig. 5b

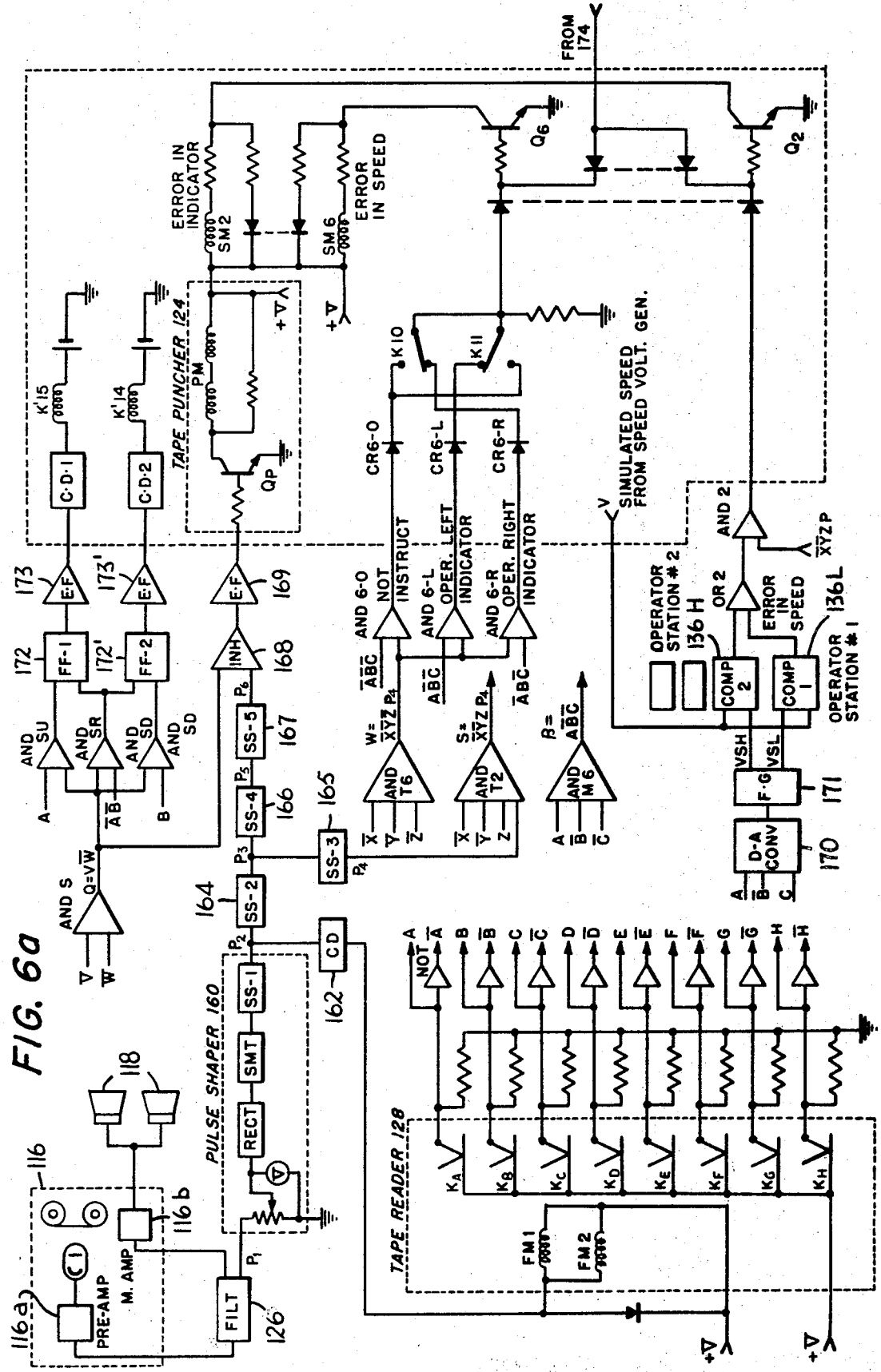

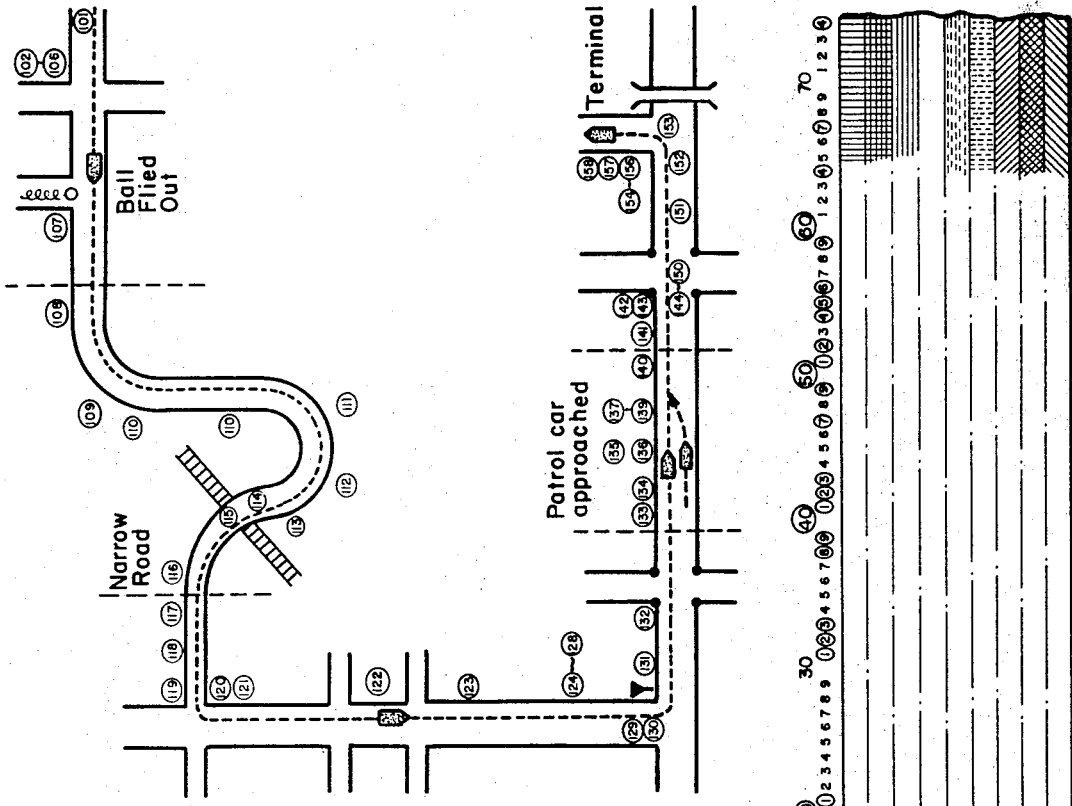

FIG. 8a

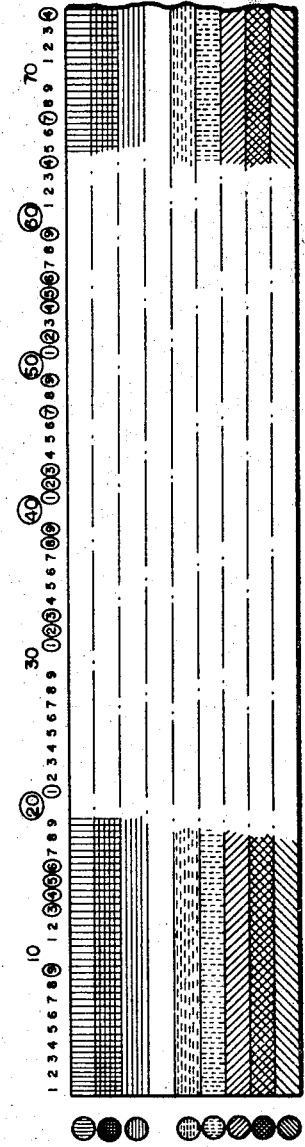

RESULTS OF SKILL TESTS

Figure in parentheses indicate the number of determinations according to the regulations

RESULTS BY ITEMS

| ITEM | Number of Determinations | Number of Errors |
|---|---|---|
| Accelerator | 8 (1) | ( ) |
| Speed | 44 (28) | ( ) |
| Brake | 47 | |
| Clutch | 0 | |
| Gear shifting | 18 | |
| Traffic indicator | 21 (21) | ( ) |
| Steering handle | 20 (1) | ( ) |
| Others | 0 | |
| Total | 158 (51) | ( ) |

Simbols:
▼ Temporary Stop
⊥ Cross with signal
--- Direction of Advance

Note: Perforations on tape indicate your errors and their ordinal numbers correspond to those on map

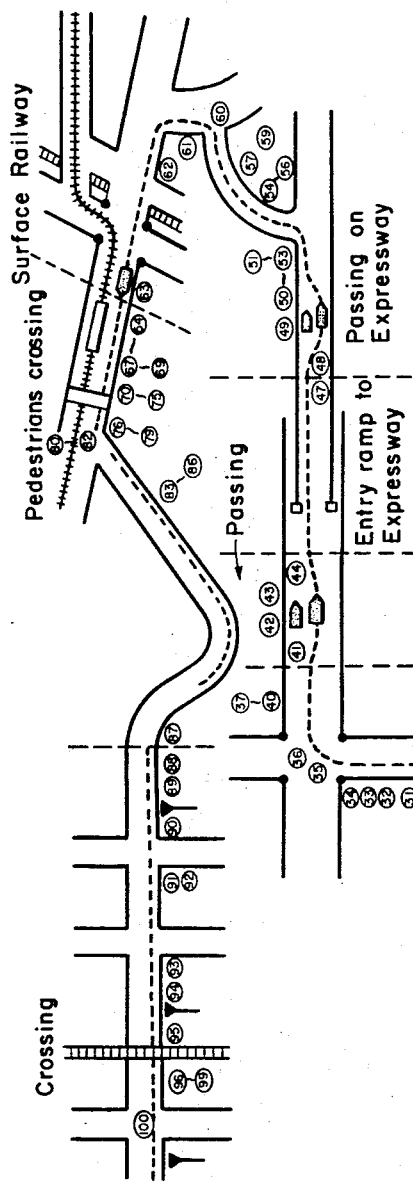
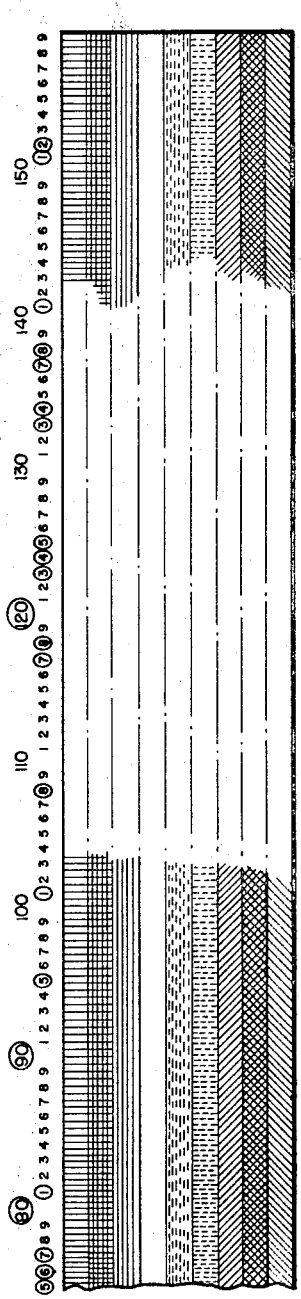
FIG. 8b

United States Patent Office 3,537,191
Patented Nov. 3, 1970

3,537,191
DRIVING SKILL TESTING APPARATUS
Kazuo Aso, Yokosuka, Japan, assignor to Mitsubishi
Precision Kabushiki Kaisha, Tokyo, Japan
Filed Oct. 21, 1968, Ser. No. 769,163
Int. Cl. G09b 9/04
U.S. Cl. 35—11                          6 Claims

ABSTRACT OF THE DISCLOSURE

A motion picture projector at a central station displays scenes and produces intermittently AC 4.5 kc. signals to stepwise read out from a programming punched tape the instructions indicating controls to be operated. After decoded, the instructions are successively applied to each operator's station to determine the erroneous operation of the indicated controls. Each operator's station is provided with a speed voltage generator, a tape puncher and error indicator lamps. The speed generator calculates a simulated speed by taking into account of the effects of ascending or descending a slope in addition to the usual acceleration and deceleration. The calculated speed is supplied to the central station and compared with the particular upper and lower speed limits by a comparison device provided for each operator's station. If any operator made an error, his tape puncher punches the associated record tape in that row specified by the instruction and then steps the tape and the corresponding lamp is energized. The absence of an error causes the tape to step with no perforation.

BACKGROUND OF THE INVENTION

This invention relates to apparatus for the automatic group test of individual operators in the operation of a plurality of the controls, such as the controls of an motor vehicle.

There has been already known a training apparatus comprising a plurality of simulated operator's stations, a motion picture projector in combination with a projection screen positioned in front of the operator's station to present the operators to a predetermined series of stimuli such as the normal traffic situation, various traffic hazards and incidents which might be encountered in trip on public ways, means for comparing the skill and reaction time of each operator in response to various stimuli presented upon the screen with their models, and means for recording the results of the comparison.

Errors done by the respective operators have been recorded at the central station for each operator and the simulated speed has been compared only with the upper limit. Also the simulated speed did not include ascent or descent effects.

SUMMARY OF THE INVENTION

Accordingly it is a general object of the invention to improve the above cited training apparatus.

It is another object of the invention to provide an improved apparatus for the group test of individual operators in the operations of a plurality of controls in a motor vehicle which apparatus is efficient and effective for retraining operators whose skill is not yet satisfactory.

It is still another object of the invention to provide a group test apparatus of the type described in the preceding paragraph and capable of readily determining whether or not tested operators will have completely aquired the operation of a motor vehicle to a predetermined minimum level required to drive the vehicle on the public ways.

The invention accomplishes the above cited objects by the provision of an apparatus for the group test of individual operators in the operation of a plurality of controls in a motor vehicle, comprising a plurality of operator's stations each including a plurality of controls simulating those of an actual vehicle, a central station including motion picture projection means for providing a visual display for observation for the operator's stations, and means for imparting to each of the operator's station the instruction for indicating the operation of a selected one of the controls in accordance with the specific display, speed voltage generator means at each of the operator's stations for calculating a simulated speed, speed comparison means disposed at the central station one for each operator's station for comparing the simulated speed with the reference speed, characterized in that a length of motion picture film disposed in the projection means has audio frequency pulses of a predetermined frequency successively stored along the length of the film at selected locations, the central station is provided with a programming medium having coded thereon the instructions indicating the operation of the controls, the upper and lower limits of the simulated speed and the introduction of ascent or descent effects, the programming tape responding to the successive pulses form the film to supply the instructions indicating the operation of the controls to each of the operator's stations but supplying the speed instructions to each of the speed comparison means, the speed comparison means including means responsive to the speed instruction to produce the lower and upper limits of speed corresponding to the received speed instruction to produce an error signal of speed when the simulated speed is not between the upper and lower limits and that each of the operator's stations is provided with one operation determination circuit responsive to both each of the instructions indicating the type of controls to be operated and each of the error signals of speed to indicate the presence of an error in the corresponding operation, and recording means responsive to the presence of any error to effect a record on the associated recording medium at a predetermined position, the speed voltage generator means including means for introducing the climbing up and down effects in calculating the simulated speed.

Preferably the signal stored in the length of motion picture film may include the instruction pulse having a frequency of 4.5 kilocycles per second and voice signals having frequencies of less than 4.5 kilocycles per second to elucidate the visual display with a separation filter provided for separating the pulse signals from the voice signals.

The speed comparison means may advantageously include a digital-to-analog converter responsive to a speed instruction to provide the corresponding analog signal, a function generator responsive to the analog signal to provide an upper and lower limits of speeds prescribed by the speed instructed, and a pair of comparator circuits, one of which is supplied with the upper limit of speed and a simulated speed from the associated operator's station to provide an error signal when the simulated speed is above the upper limit of speeds, the other of which is supplied with the lower limit of speeds and the simulated speed to provide an error signal when the simulated speed below the lower limit of speeds, the error signal being applied to the operation determination circuit for speed.

The operation determination circuit may conveniently include a set of normal closed contacts responsive to the erroneous operation of the corresponding control to be open, and means responsive to the instruction supplied thereto through the set of normally closed contacts to bring the recording medium into the corresponding predetermined location.

The recording means may advantageously include a single tape puncher responsive to a pulse lagging behind of a pulse representative of the instruction by a predetermined period of time to punch the record medium.

The speed voltage generator means may include a speed capacitor having developed thereacross a voltage representative of a simulated speed and capable of being applied with a voltage in differential relationship with a first-mentioned voltage through a set of contacts closed when the effect of ascending an upgrade is to be introduced, and a voltage in addition relationship with the first-mentioned voltage through a set of contacts closed when the effect of descending a downgrade is to be introduced.

BRIEF DESCRIPTION OF THE DRAWINGS

The invention will become more readily apparent from the following detailed description taken in conjunction with the accompanying drawings in which:

FIG. 5a is a fragmental plan view of a programming punched tape suitable for use with the invention;

FIG. 5b is a fragmental plan view of a recorded tape indicating erroneous operations of an operator to tests;

FIG. 6a shows the dials of the electrical circuitry illustrated in FIG. 2 with certain parts omitted;

FIGS. 8a and b show together a chart for the results of tests in the operation of a simulated motor vehicle adapted to be applied with the associated recorded sheet such as shown in FIG. 5b.

DESCRIPTION OF THE PREFERRED EMBODIMENT

Figure 1:
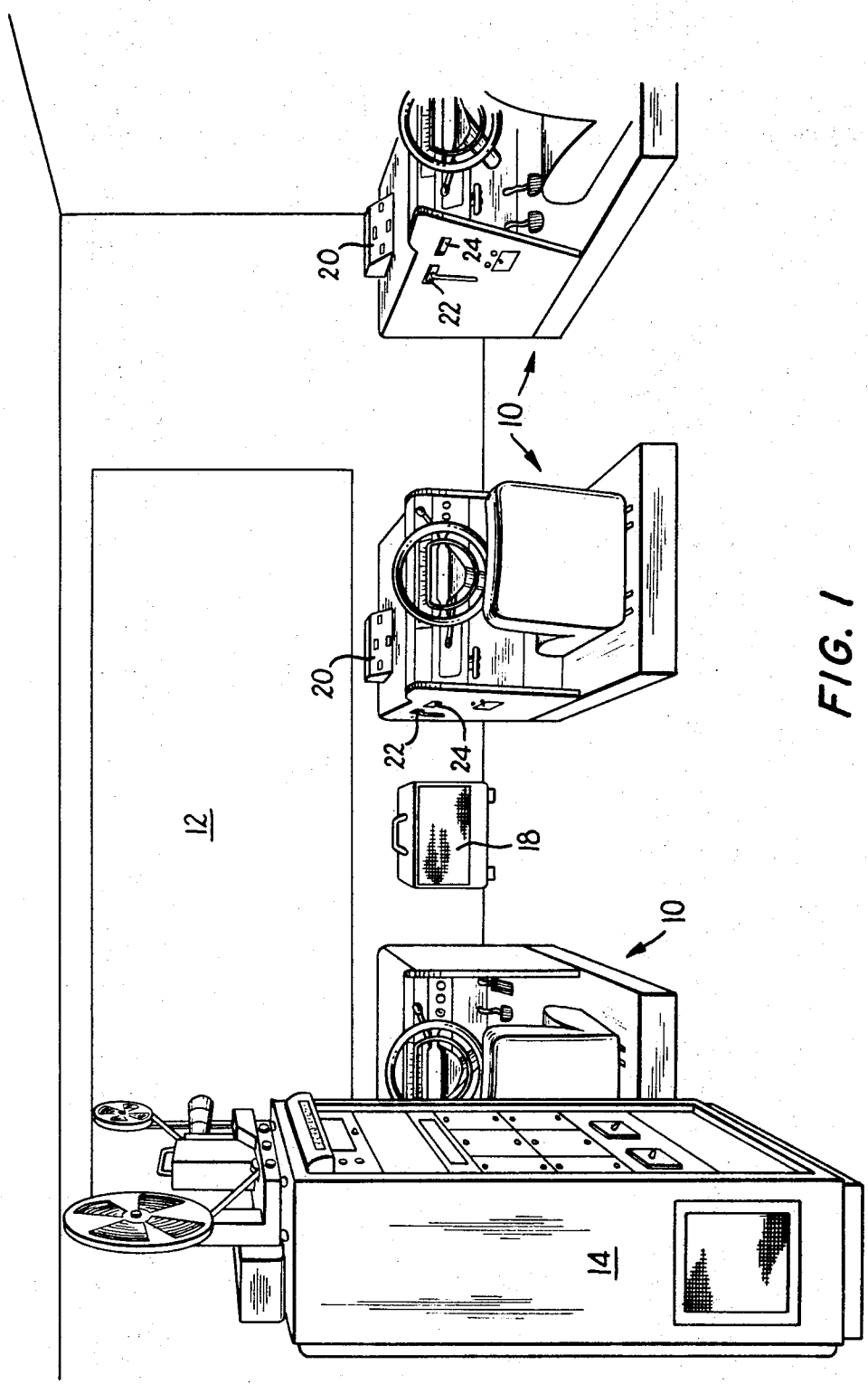
FIG. 1 is a pictorial view illustrating the general arrangement of a preferred embodiment of the invention with parts schematically shown.

Referring now to the drawings and FIG. 1 in particular, there is illustrated the general arrangement of an apparatus constructed in accordance with the principles of the invention. The arrangement illustrated comprises a plurality of simulated operator's stations generally designated by the reference numeral 10 and provided with the simulated controls, meters, indicators, etc., in the same manner as in an actual motor vehicle as will be described hereinafter, a projection screen 12 disposed in front of all the operator's stations 10 and a central console 14 disposed in the rear of the operator's stations on which is secured a motion picture projector 16. The projector 16 serves to display onto the screen 12 a sequence of scenes to present to the tested operators a series of problems or tests and also operatively coupled through the central console 14 to a loud speaker 18 disposed, for example, below the screen 12 to give the sound effect of the scene being displayed thereon for the purpose of giving the reality the scene as well as reproducing the elucidation of the scenes and the instruction by the examiner.

With the arrangement illustrated the operators continue to respond to both the series of problems displayed onto the screen 12 and the sound effect such as various imitation sounds, elucidation and instruction reproduced by the loud speaker 18 to perform the specified operation (which involves the correct operation and any reckless operation) as the case may be. On the other hand, the central console 14 is operated to monitor and determine any erroneous operation which may be performed by each of the tested operators on the basis of the particular program proceeding in synchronization with the sequence of scenes successively displayed onto the screen 12.

Each of the operator's stations is provided with a plurality of error indicator lamps 20, a tape puncher 22, and an error counter 24. If the central station or console 14 has determined an erroneous reaction or operation of any operator to the specific scene on the screen 12 the same is operated to turn on the corresponding one of the indicator lamp 20 at the erroneous operated station while at the same time actuating the tape puncher 22 and the error counter 24 at that station in the manner as will be fully described hereinafter.

Figure 2:
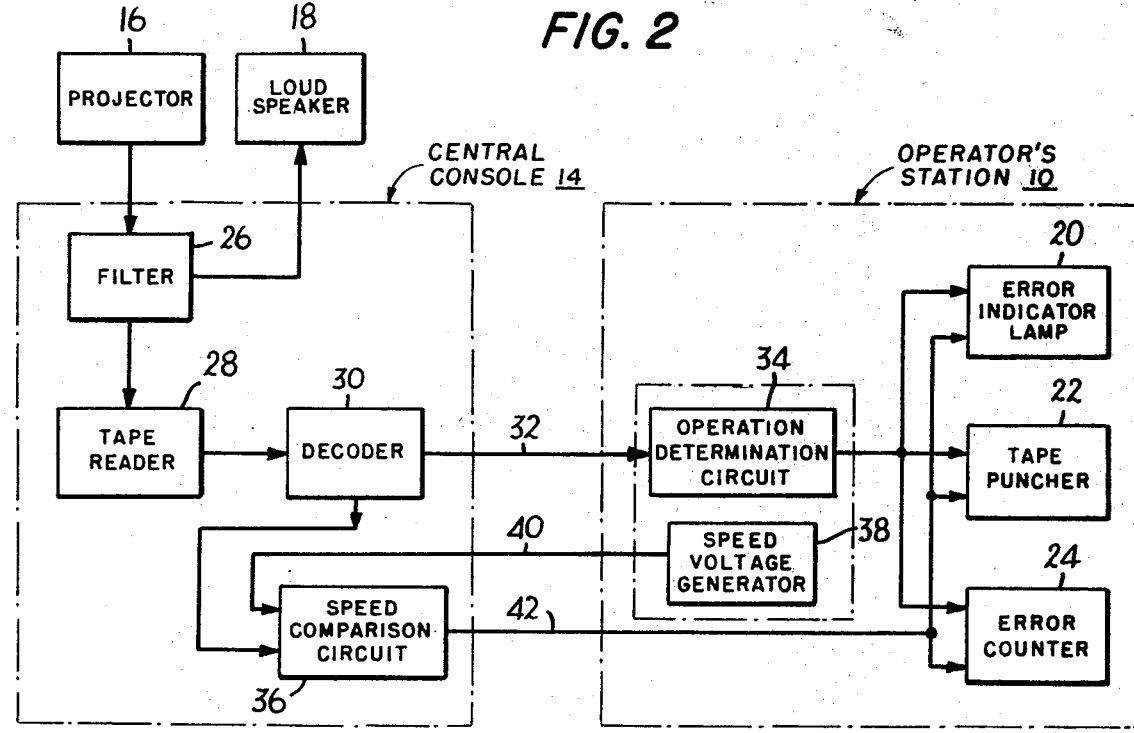
FIG. 2 is a block diagram of an electrical circuitry suitable for use with the invention.

The principles of the invention will now be described with reference to FIG. 2. In FIG. 2, the motion picture projector 16 has loaded therein a length of motion picture film (not shown) including a series of image frames and a sound track in which are recorded audible signals for elucidating the scenes displayed on the screen, giving the sound effect such as imitation sound the scenes and instructing the operators. The sound track has further audiofrequency pulses having a predetermined frequency for example 4.5 kilocycles per second successively recorded therealong at selected locations for the purpose of prescribing positions at which the operations performed by the respective operators are tested. It is noted that the audible signals should be of frequencies less than the said predetermined frequency in this case 4.5 kilocycles per second.

In operation, the projector 16 displays a series of scenes onto the screen while at the same time the intelligence recorded in the sound track on the motion picture film is converted to electrical signals in the well-known manner. It will be readily understood that the converted electrical signals include the signal having a frequency of 4.5 kilocycles per second and signals below the just specified frequency representative of the imitation sounds, elucidation and instructions. The electrical signals are then applied to a separation filter 26 disposed in the central console 14 by which they are separated into the signal of 4.5 kilocycles per second and the signals of less than 4.5 kilocycles per second. After amplification the latter signals are supplied to the loud spaker 18 to provide audible signals serving to give the sound effect upon a specific scene being displayed onto the screen and/or to elucidate the scene.

The 4.5 kc. signal is converted to a rectangular pulse and applied to a tape reader 28 operatively coupled to a programming medium having the instructions in the form of perforations punched in accordance with the particular program of determining erroneous operations which might be performed by the operators. Such a medium will be described hereinafter. When applied with the pulse signal, the tape reader 28 reads out the instruction from the tape and supplies it to a decoder 30 for decoding. If the decoded instruction represents the operation of a selected one of a plurality of simulated controls it is directly applied through an electric lead 32 to the corresponding circuit of an operation determination circuitry 34 disposed at each operator's station to monitor the reaction of each operator thereto and determine whether such a reaction would be correct or erroneous.

If the reaction at any operator's station has been determined to be erroneous the associated determination circuits is operated to energize the corresponding indicator lamp 20, the tape puncher 22 and the error counter 24 at that operator's station thus the illuminated lamp 20 indicates that the operator performed the erroneous operation of the selected control and the tape puncher 22 punches the mating recording the type of erroneous operation with the error counter 24 counting "one" up.

On the other hand, if the decoded instruction relates to a speed of the simulated vehicle, it is applied to a speed comparison circuit 36 disposed one for each operator's station in the control console 14 (see FIG. 1), The speed comparison circuit 36 compares the instruction with a simulated speed supplied thereto by a speed signal generator circuit 38 disposed at the associated operator's station through an electric lead 40. If the simulated speed is not between the upper and lower limits of speed prescribed by the speed instruction then the comparison circuit 36 provides an error signal which is, in turn, applied through an electric lead 42 to the associated operator's station with the results that the components 20, 22 and 24 are operated in the manner as previously described.

While the various components in the form of rectangles have been shown in FIG. 2 only for purpose of illustration it is to be understood that some of the components may be omitted and a physical combination to some components may be made in practicing the invention. Alternatively an additional component or components may be provided if desired.

Each of the operator's stations 10 is provided, in addition to the error indicator lamps 20, the tape puncher 22 and the error counter 24, with various controls, switches, meters etc., disposed in the same manner as in an actual vehicle and quite identical in appearance, and operation to those disposed in the actual vehicle. Referring now to the reference numerals denoted in FIG. 3, 45, 46 and 47 designate respectively an accelerator pedal, a brake pedal and a clutch pedal and 48, 49 50 and 51 designate respectively a steering handle, a hand brake, a gear shifting lever and a lever for controlling traffic indicators. A switch for turning on and off head lights, and an ignition switch are respectively designated by the reference numerals 52, 53 and 54 while a speed meter and an alarm indication lamp are respectively designated at 55 and 56.

A plurality of error indicator lamps 20 serve to indicate to the associated operator various erroneous operations performed by him if present. To this end, the error indicator lamps 20 are disposed under his eyes in order to permit him to easily view them.

Figure 3:
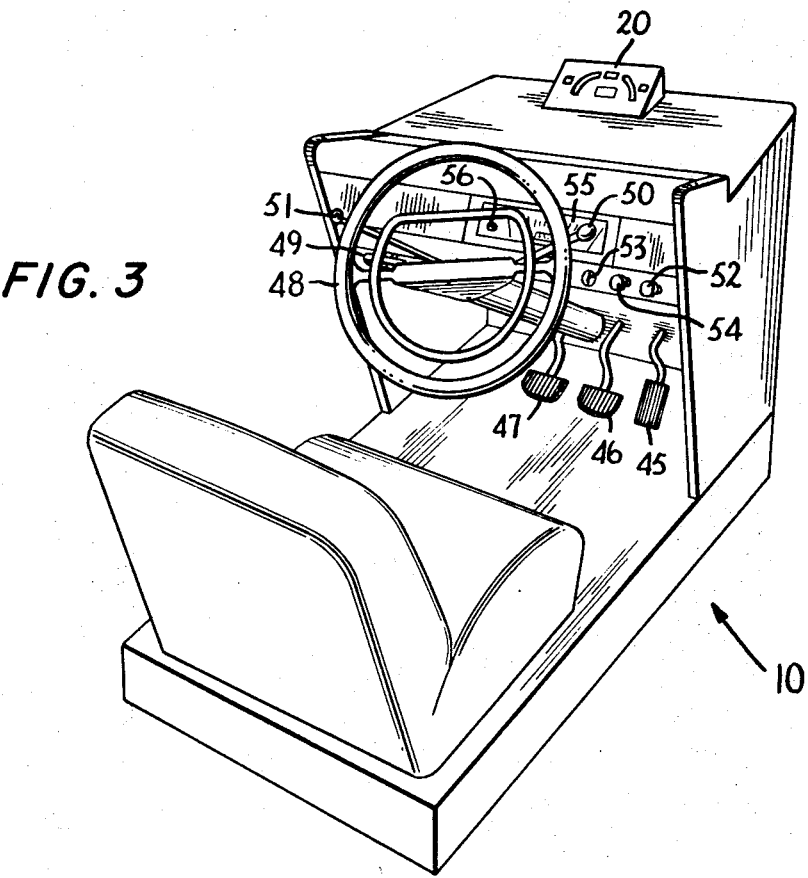
FIG. 3 is a perspective view of a simulated operator's position forming a part of the invention.
Figure 4:
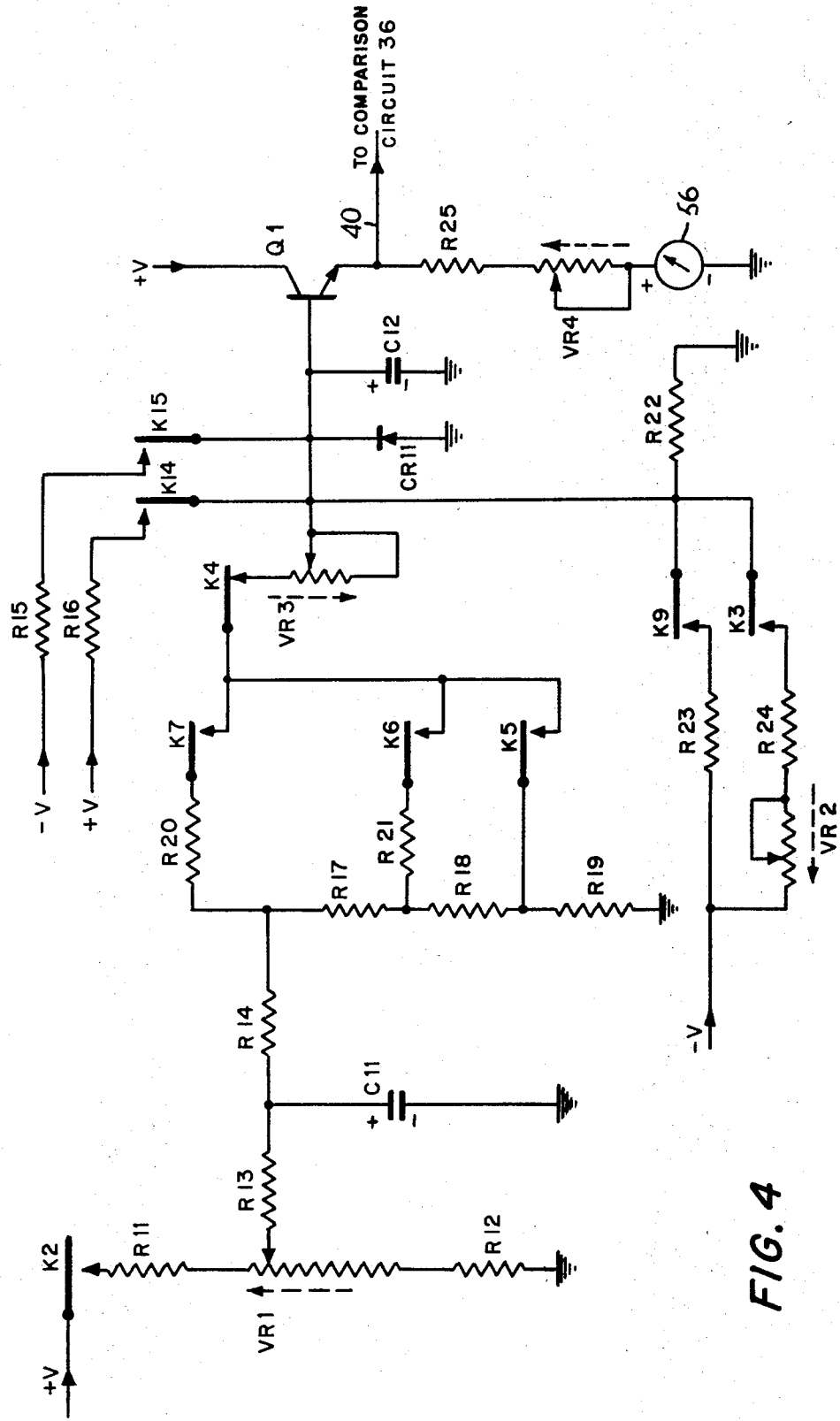
FIG. 4 is a schematic diagram of a speed voltage generator circuit disposed in the simulated operator's position illustrated in FIG. 3.

Referring now to FIG. 4, there is illustrated a speed computer or voltage generator circuit suitable for use with the invention. The circuit is disposed at each operator's station and responsive to the operation of the accelerator, brake and clutch pedals 45, 46 and 47 (see FIG. 3) respectively and of the gear shifting lever 50 (see FIG. 3) to calculate a simulated operating speed equal to a speed at which an actual vehicle is to be driven under the same operating situations thereby to indicate the calculated figure on the speed meter 55. It is to be noted that the computer circuit computes a simulated speed by taking into account of a slope signal delivered thereto in synchronization with a slope being displayed onto the screen and representing the effect of an ascent or a descent as viewed in that scene.

The construction of the computer circuit will readily be understood from the subsequent description for the operation thereof. The ignition switch 53 (see FIG. 3) is closed to close the associated normally open relay contacts K2 whereupon a battery (not shown) delivers a current from its positive terminal +V kept for example, at "+24 v." through a resistor R11, a potentiometer VR1 and a resistor R12 connected in series circuit relationship to the ground. The dotted arrow denoted adjacent the potentiometer VR1 indicates a direction in which the associated movable arm slides along the potentiometer upon depressing the accelerator pedal as shown at 45 in FIG. 3.

A voltage at the movable arm is applied to a time delay network consisting of a resistor R13 and a capacitor C11 serially connected across the series combination of the variable and fixed resistors VR1 and R12. The time delay network R13, C11 simulates a time delay in a change in number of revolution per unit time of a simulated internal combustion engine upon operating the accelerator pedal.

The voltage across the capacitor C11 is supplied to a voltage divider network including serially connected resistors R14, R17, R18 and R19. The network serves to respond to the operation of the gear shifting lever such as shown at 50 in FIG. 3 to determine a normal operating speed of a simulated vehicle. To this end, each junction of any pair of adjacent resistors is coupled to a different one of normally open relay contacts K5, K6 or K7 adapted to be closed when the gear shifting lever is put in its low, second or high position respectively. Connected between the junction of the resistors R14 and R17 and the relay contacts K7 is a resistor R20 in order to impart a suitable time delay to an acceleration effected upon bringing the lever into its high position. Similarly a resistor R21 is connected between the junction of the resistors R17 and R18 and the relay contacts K6 to impart a suitable time delay to an acceleration obtained upon bringing the lever into its second position while the junction of the resistors R18 and R19 is directly connected to the relay contacts K5 to impart a suitable time delay to an acceleration occurring upon bringing the lever into its low position. The time delay imparted to the acceleration at each position of the gear shifting lever simulates a time delay in a change in simulated speed responsive to the accelerator pedal and is determined by a time constant of a speed capacitor C12 and the resistors connected in a circuit for charging that capacitor.

In order to simulate the operation of the clutch pedal as shown at 47 is shown in FIG. 3, the relay contacts K5, K6 and K7 are connected to normally closed relay contacts K4 connected to a variable resistor VR3 whose resistance is controlled by the clutch pedal. The depression of the clutch pedal causes the variable resistor VR3 to increase in resistance through the movement of the associated movable arm in the direction of the dotted arrow denoted adjacent that resistor. More specifically, if the clutch pedal is depressed to approximately a half the stroke thereof the relay contacts K4 are opened to simulate the complete disengagement of an actual clutch. Under these circumstances the voltage from the voltage divider network representative of the number of revolution of the simulated engine is not applied to the speed capacitor C12. For example, as the clutch lever is gradually released with the gear shifting lever put at its low position a point is reached where the relay contacts K4 are closed to permit the voltage across the resistor R19 be applied to the variable resistor VR3. At that time the magnitude of resistance of the variable resistor VR3 determines a rate of change in simulated speed. Further when the clutch pedals has been fully released the variable resistor VR3 has a zero resistance. This causes the rate of change in speed to have a maximum magnitude. Thus it will be appreciated that both the relay contacts K4 and the variable resistor VR3 simulate control of a transmission force through the sliding movement of an actual clutch.

Further in order to exhibit the slope effect as previously described, a pair of series combinations of a resistor and normally open relay contacts are connected to the speed capacitor C12. More specifically when an ascent is displayed on the screen normally open relay contacts K15 are adapted to be closed to cause a voltage from the negative terminal —V kept, for example, at —24 v. of a battery to be applied to the speed capacitor C12 through a resistor R15 and the now closed contacts K15 which simulates a decrease in speed due to an ascent operation. For descent, normally open relay contacts K16 are adapted to be closed to cause a voltage from the positive terminal +V kept, for example, at +24 v. to be applied to the speed capacitor C12 through a resistor R16 and the now closed contacts K16 which simulates an increase in speed due to a descent operation. It is to be noted that the resistors R16 and 16 serve to determine a rate of change in speed due to an ascent or a descent respectively.

The simulated brake application is accomplished by the application of a negative voltage to the speed capacitor C12 to cancel out a positive acceleration voltage.

The simulated hand brake as shown at 49 in FIG. 3 can be operated to close normally open relay contacts K9 (see FIG. 4). The closure of the contacts K9 permits a voltage from the negative terminal —V of the battery to be applied to the capacitor C12 through a resistor R23 and the now closed contacts K9 thereby to simulate the operation of an actual hand brake. Similarly simulated brake pedal as shown at 46 in FIG. 3 is depressed to close normally open relay contacts K3 to apply a voltage from the negative terminal —V of the battery to the capacitor C12 through a variable resistor VR2, a resistor R24 and the now closed contacts K3 for the purpose of simulating the operation of an actual brake pedal. The dotted arrow denoted adjacent the variable resistor VR2 indicates a direction in which a movable arm on the resistor VR2 is moved upon depressing the simulated brake pedal. Thus it will be seen that the more the depression of the simulated brake pedal the higher the deceleration will be.

A suitable semiconductor diode CR11 is preferably connected across the speed capacitor C12 in order to prevent the speed voltage across the latter from becoming negative due to a negative voltage applied to the capacitor during the simulated braking or hill climbing operation. Also a resistor R22 is shown in FIG. 4 as being connected across the speed capacitor C12 to form a time delay netword with the capacitor, serving to simulate a progressive decrease in speed due to the running resistance occurring during the inertial running resulting from an interruption of a transmission force from the associated engine provided by either the gear shifting lever or clutch pedal.

Thus a specified speed voltage has been developed across the capacitor C12 in response to the operation of a selected one of the controls such as the pedals and lever. This speed voltage is applied to a base of an n-p-n transistor Q1 of the emitter follower type and then to a speed meter 56 through a series combination of fixed and variable resistors R25 and VR4 respectively serving to control the sensitivity of the meter. The output signal from the emitter of the transistor Q1 is also fed into the comparison circuit 36 (see FIG. 2) through the lead 40.

In FIG. 4 shows by way of example the various circuit parameters found to be satisfactory in practicing the invention. However it is to be noted that the invention is not restricted to such circuit parameters.

It is recalled that according to the principles of the invention any erroneous operation performed by individual one of the operators is monitored and determined by the instruction read out from a programming tape operatively associated with the tape reader 28 (see FIG. 2). It has been found that the eight-unit code system can be effectively and advantageously utilized in practicing the invention. FIG. 5a shows one example of programming punched tapes of eight-unit code system found to be particularly suitable for use with the invention. In FIG. 5a, a black circle represents a perforation on the tape and each of lateral rows of codes, indicates one instruction on the bass of which whether the corresponding operation performed by each operator is correct or erroneous is determined. Each code is separated into two groups one of which includes five elements X located in channels X, Y, Z, V and W representative of the type of controls to be operated and the other group includes three elements located in channel A, B and C representative of the manner in which the associated control is operated. For example, a code including a perforation in the channel A alone indicates that what is to be operated is a traffic indicator and that the left indicator is to be operated. This code is read out by the tape reader 28 and then applied to the decoder 30 and thence to the corresponding circuit of the operation determination circuitry 34 at each operator's position for monitoring and error determining purposes.

It is to be noted that FIG. 5a aims at the representation of the types of codes for different instructions and does not show the codes in the programmed order of the tests.

FIG. 5b shows a piece of recording tape suitable for use in the tape puncher. In FIG. 5b the symbol "black circle" again represents a perforation. The tape illustrated includes a lateral row of perforations on the leading edge thereof for the purpose as will be apparent hereinafter and is shown only for the purpose of indicating the relative positions of perforations representative of various erroneous operations. For example, an erroneous operation of traffic indication is recorded on the tape in a sixth channel.

Referring now to FIGS. 6a and b there is illustrated an embodiment of the invention. As previously described, a motion-picture projector 116 has loaded therein a length of motion-picture film including a sequence of scenes and a sound track in which the sound effects, elucidation for the scenes and instructions are recorded in overlapped relationship with audio frequency pulses $P_1$ prescribing positions where the various operations performed by the respective operators are monitored determined whether they will have been correct or erroneous. Preferably the pulse $P_1$ may have a frequency of 4.5 kilocycles per second and a duration of 20 milliseconds (see waveform *a* in FIG. 7). In operation the projector 116 displays a sequence scenes onto a projection screen (not shown in FIG. 6a) and also converts the intelligence in the sound track on the film to electrical signals in the well-known manner. The signals are then amplified by a preamplifier 116a and the amplified signals are fed into a separation filter 126 where they are separated into the prescribing audio frequency pulse having a frequency of 4.5 kilocycles per second and the audible signal having frequencies of less than 4.5 kilocycles per second and representing the sound effect, elucidation and instructions.

The audible signal is amplified by a power amplifier 116b and then converted to audible sounds by loudspeakers 118. On the other hand, the prescribing signal is applied to a pulse shaper circuit 160 after suitable control of its amplitude. The circuit 160 may include a rectifier and Schmitt circuit connected to the rectifier, a monostable multivibrator connected to the Schmitt circuit to provide a rectangular pulse $P_2$ having a duration of 20 milliseconds as shown at waveform *b* in FIG. 7.

The pulse $P_2$ from the pulse shaper circuit 160 or the monostable multivibrator thereof is applied to a tape reader 128 through a clutch driver amplifier 162 for amplifying the pulse $P_2$. The pulse $P_2$ then permits a pair of parallel electromagnets $FM_1$ and $FM_2$ forming a part of a tape transportation mechanism to be energized to step a programming tape such as shown in FIG. 5a loaded in the tape reader by one code position. Thus it will be appreciated that each pulse $P_2$ acts a driving pulse for transporting the programming tape to the succeeding code position for reading out.

Figure 7:
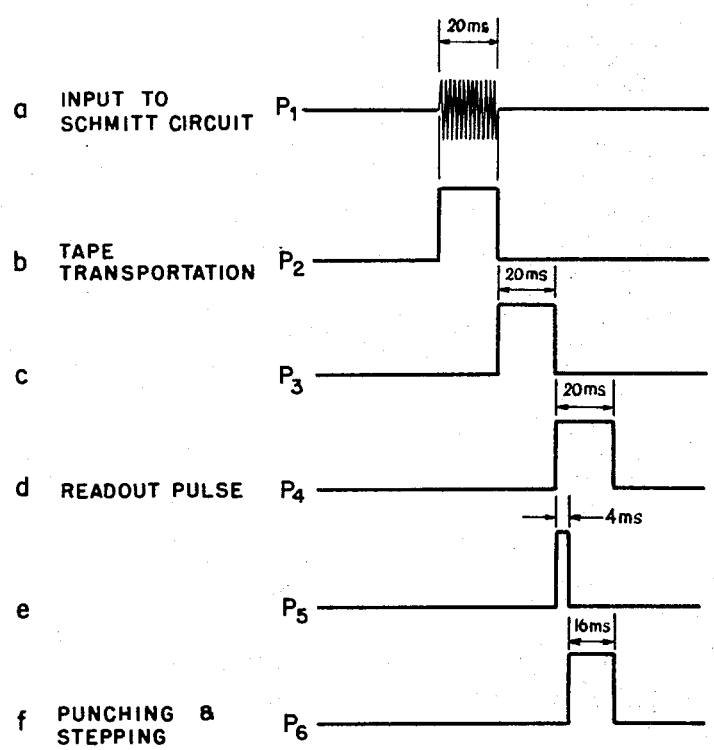
FIG. 7 is waveforms developed at various points in the circuitry shown in FIGS. 6a and b.

The driving pulse $P_2$ is also applied to a series combination of monostable multivibrators 164 and 165 to provide a read out pulse $P_4$ lagging a predetermined period of time in this example 40 milliseconds with respect to the pulse $P_2$ as shown at waveform *d* in FIG. 7. A rectangular pulse $P_3$ (shown at waveform *c* in FIG. 7) developed at the junction of both multivibrators lags a predetermined period of time in the illustrated example 20 milliseconds with respect to the pulse $P_2$ and is applied to a monostable multivibrator 166 to be converted to a shorter pulse $P_4$ having a leading edge substantially coinciding with the tailing edge of the pulse $P_3$ and a duration of 4 milliseconds as shown at waveform *e* in FIG. 7. Then the shorter pulse $P_5$ is applied to a monostable multivibrator 167 to provide a rectangular pulse $P_6$ having a leading edge substantially coinciding with the tailing edge of the pulse $P_5$ and a duration of 16 milliseconds and terminating substantially simultaneously with the read out pulse $P_4$ as shown at waveform *f* in FIG. 7. The pulse $P_6$ is supplied to an INHIBIT circuit 168 at one input and thence to an emitter follower type transistor 169 for the purpose as will be apparent hereinafter.

In FIG. 6a a tape reader 128 is shown as including a plurality of sets of closed contacts. However it is to be understood that these sets of contacts are operatively coupled to the code columns or channels on a programming tape such as shown in FIG. 5a and are closable only when they engage the perforations on the tape. In the illustrated embodiment, as the tape has eight channels A, B, C, X, Y, Z, V and W as shown in FIG. 5a the tape reader 128 includes eight sets of contacts designated by the reference character K with suffixes representing the associated code channels. For example, the set of contacts KA is positioned on the channel A on the tape.

When closed through the associated perforation each set of contacts K provide a high output which may be called binary "ONE." When open it provides a zero output which may be called "binary ZERO." In FIG. 6 the sets of contacts KA to KW inclusive are shown as providing the respective outputs A, B, C, X, Y, V and W while producing these complements $\overline{A}, \overline{B}, \overline{C}, \overline{X}, \overline{Y}, \overline{Z}, \overline{V}$ and $\overline{W}$ through "NOT" circuits respectively. The output from the tape reader 128 is then applied to logic elements forming a decoder such as shown at 30 in FIG. 2.

Since each code includes two groups of elements as previously described, the decoder includes preferably one group of logic elements operatively coupled to the outputs from the contacts KA, KB and KC of the tape reader 128 and the other group of logic elements operatively coupled to the output of the remaining contacts and each having one input applied with the read out pulse $P_4$. Only for purpose of illustration the logic elements of the one group are designated hereinafter by the reference character M with suffixed digits representing the positions of perforations on the recording tape such as shown in FIG. 5b and the logic elements of the other group are designated by the reference character T with the similar suffixed digits. For example, the logic elements M6 and T6 are those concerning the traffic indication.

It is now assumed that the code on the programming tape instructing that a left traffic indicator is to be operated is at the read out position in the tape reader 128. The code includes only a perforation in the channel as shown in FIG. 5a. Under the assumed condition, the outputs $\overline{X}, \overline{Y}$, and $\overline{Z}$ from the tape reader 128 are applied to inputs to an "AND" circuit T6 and the outputs $\overline{A}, \overline{B}$ and $\overline{C}$ are applied to input to "AND" circuit M6 to provide an output $\beta = \overline{ABC}$. Upon applying the read out pulse $P_4$ to the remaining input of the AND circuit T6, the latter provides an output $w = \overline{X}, \overline{Y}, \overline{Z}, P_4$. The the outputs $w$ and $\beta$ from both "AND" circuits are applied to an "AND" circuit 6–L to provide an output serving to determine whether or not each of the operators has operated his left traffic indicator. The latter output is transmitted to each operator's station, that is, to the corresponding portion of an operation determination circuitry such as previously described in conjunction with FIG. 2.

More specifically the output from the "AND" circuit 6–L is applied through a diode CR 6–L to a set of transfer contacts K11 whose movable arm is normally in its upper position as viewed in FIG. 6a. The movable arm is arranged to respond to the operation of the associated left traffic indicator to move to its lower position. With the set of transfer contacts K11 kept in its position illustrated in FIG. 6a, the output from the "AND" circuit 6–L passes to an NPN transistor Q6 to render it conducting. The conduction of the transistor Q6 causes the associated selection electromagnet SM6 to be energized with the result that a traffic indication column or channel in the example of FIG. 5b a sixth channel recording tape is ready for punching. More specifically a tape puncher includes punches (not shown) equal in number to the recording channels on the tape and aligned in a row widthwise of and above the tape and the energized electromagnet in this case the electromagnet SM6 is operated to select the sixth punch to be ready for punching.

At that time the pulse $P_6$ as above described lagging slightly with respect to the read out pulse $P_4$ is applied to a base of an NPN transistor $Q_p$ to render it conducting. Therefore a punching electromagnet PM is energized to cause the sixth punch selected by the selection electromagnet SM6 to punch the recording tape at a predetermined channel selected followed by the recording tape stepping to the succeeding recording position.

At the same time that error indicator lamp such as shown at 20 in FIGS. 2 and 3 corresponding to the left traffic indicator is energized for a predetermined period of time, for example, approximately 1 second through an energizing circuit (not shown). In addition, the associated error counter as previously described counts "one" up.

It is now assumed that slightly before the output from the "AND" circuit 6–L is applied to the set of contacts K11, at the particular operator's station, the operator at that station has just operated his left traffic indicator. Under the assumed condition, the set of contacts K11 switches to its lower position preventing the output from passing to the transistor Q6 and hence to the electromagnet SM6 with the result that the recording tape is caused to step to the succeeding recording position with no perforation.

It will be understood from the illustration in FIG. 6a that for the operation of the right traffic indicator a similar process proceeds and also that for no instruction for performing the traffic indication the operation of the left or right indicator causes a set of transfer contacts K10 to switch to its lower position as viewed in FIG. 6 resulting in the recording of an erroneous operation.

It is to be understood that, in order to monitor the acceleration and brake applications, handle steering, gear shifting, etc., and determine the erroneous reactions of the operators thereto, the components similar in construction and operation to those above described in terms of the traffic indication are disposed at both the central station.

In this way, the driving pulses $P_2$ are successively provided to cause various tests to be made, in accordance with the programming tape. In this process if a code including a performation in the Z column but not perforations in the X and Y columns on the programming tape has been brought into the read out position then a speed test is to be made as will be readily understood from FIG. 5a. Under these circumstances, an "AND" circuit T2 provides an output $s = \overline{YZ}P_4$. At that time signals resulting from the A, B and C columns on the programming tape are supplied to a digital-to-analog converter 170 where they are converted to the corresponding analog signal. Only for purpose of illustration, it is assumed that a code for speed determination includes a perforation on each of the A and C columns and not a perforation in the B column on the programming tape. This means a test as to whether or not a similated speed will have ranged from 30 to 50 km./h. as will be readily understood from FIG. 5a. Thus the signals A, B and C have been supplied to the converter 170. Then the analogue output from the converter 170 is applied to a function generator 171 which, in turn, provides the upper and lower speed limits VSH and VSL corresponding to the applied analogue input. In the assumed conduction, the function generator 171 produces both an analogue signal for the upper limit of 50 km./h. and an analogue signal for the lower limit of 30 km./h.

On the other hand, each operator's position 10 transmits to the central console such as shown in FIGS. 1 and 2 a simulated speed of its vehicle calculated in the manner as previously described in conjunction with FIG. 4.

Since the invention contemplates to test the simulated speed as to the upper and lower limits as previously described a pair of speed comparison circuits of the same construction are disposed in the central console for each operator's position. In FIG. 6, the circuits are designated by the reference characters 136–H and –L. The speed comparison circuit 136–H is arranged to compare a simulated operating speed with the particular upper speed limit VSH provided by the function generator 171 thereby to produce an output when the simulated speed is higher than the upper limit while the comparison circuit 136–L is arranged to compare the simulated speed with the particular lower limit VSL thereby to produce an output when the simulated speed is less than the lower limit.

Both the speed comparison circuits 136–H and –L are connected to an input of an "OR" circuit 2 having an output connected to one input of an "AND" circuit 2. The "AND" circuit 2 has the other input supplied from the "AND" circuit T2. Therefore, the "OR" circuit 2 provides an output only when the simulated speed is either higher than the upper speed limit VSH or less than the lower speed limit VSL, that is to say, when the simulated speed is not between the upper and lower speed limits.

The output from the "AND" circuit 2 is applied to an NPN transfer Q2 forming a part of an operation determination circuit for speed test to render the transistor Q2 conducting. Therefore the associated selecting electromagnet SM2 is energized to bring a speed column in this case a second channel on the recording tape into the punching position. Then the pulse $P_6$ is operated to repeat the process as previously described in terms of the traffic indication whereby the error in speed is recorded on the recording tape and indicated on the corresponding indicator lamp.

Further it is assumed that the driving pulses $P_2$ causes the programming tape to successively step until a code including a perforation in the V channel but not a perforation in the W channel. This code is concerned with a slope. Under the assumed condition, the signals resulting from the V and W channels are applied to an "AND" circuit S which, in turn, produces an output $Q=V\overline{W}$ meaning a slope signal. The slope signal is applied to one input of three "AND" circuits SU, SD and SR. If the speed code includes a perforation in the A chanel a climbing up signal A is applied to the other input of the "AND" circuit SU to supply a set input to a FLIP-FLOP circuit 172 to put it in its set state. The output from the circuit 172 is applied through an emitter follower type transistor 173 to a climbing up relay coil K15 disposed at each operator's position to close its contacts K15 as shown in FIG. 4. This closure of the contacts K15 causes a negative voltage to be added to a speed voltage across the speed capacitor C12 as previously described in conjunction with FIG. 4. This simulates the deceleration effect due to the climbing up operation.

Following this a code including a perforation in each of the C and V channels alone is read out from the programming tape and the signals V and $\overline{W}$ indicating a slope are applied to the "AND" circuit S which, in turn, energize one input to the "AND" circuit 188 while simultaneously a pulse $\overline{AB}$ is also applied to the other input to the circuit SR. Thus the "AND" circuit SR provides a reset signal to the "FLIP-FLOP" circuit 172 to reset it. The resetting of the circuit 172 causes the relay coil K'15 to be deenergized to open its contacts K'15 (see FIG. 4) thereby to remove the ascent effect.

Similarly the reading out of a code including a perforation in each of the B, C and V channels simulates the acceleration effect due to the descent operation through the operation of the corresponding components 172', 173', K'14. Also a horizon code following that code resets similarly the contacts K'14 as shown in FIG. 4 to remove the descent effect.

In order to prevent the tape puncher from operating upon the occurrence of a slope pulse $Q=V\overline{W}$, the "AND" circuit S serves to supply an inhibit signal to the other input to the INHIBIT circuit 168 thereby to prevent the punching pulse $P_6$ to be applied to the punching electromagnet DM.

Before the various simulated operations of the individual operators will be determined in the manner as above described, that portion having a code "SET TO START" of the programming tape is positioned directly below the contacts $K_A$ through $K_H$ of the tape reader 128 to provide an output $ABC\overline{XYZW}$ (see FIG. 5a) which has no effect on the system. Then the projector 16 is operated to provide a first pulse $P_2$ which, in turn, energizes instantaneously the feed electromagnets FM1 and 2 of the tape reader through the clutch driver 162 as previously described, whereupon the programming tape steps to engage the next code with the contacts of the tape reader 128. Then the tape reader provides a coded signal ABCXYZVW indicating the readiness for initiation of determination (see FIG. 5a).

Figure 6B:
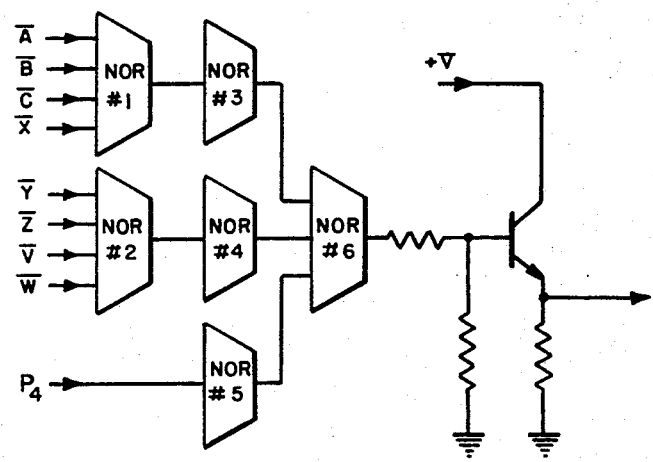
FIG. 6b is a schematic diagram of an electric circuit for which may be used in punching a start of determination on the record tape as shown in FIG. 5b.

The complement of the signal $\overline{ABCXYZVW}$ is adapted to be supplied to a pair of "NOR" circuits #1 and #2 as shown in FIG. 6b. Specifically one portion of the complement $\overline{ABCX}$ is supplied to the "NOR" circuit #1 while the other portion thereof $\overline{YZVW}$ is supplied to the "NOR" circuit #2. The "NOR" circuits #1 and #2 are connected to "NOR" circuits #3 and #4 respectively. A "NOR" circuit #5 having an input adapted to be applied with the pulse $P_4$ as previously described, is connected to a "NOR" circuit #5 to which the "NOR" circuits #3 and #4 are also connected.

Therefore it will be appreciated that the "NOR" circuit #6 provide a high output in synchronization with the application of the pulse $P_4$ to the "NOR" circuit #5. Then the output from the "NOR" circuit #6 is applied through an emitter follower type transistor 174 and a semiconductor diode to all the transistors $Q_1$ though $Q_8$ coupled to the selection electromagnets SM1 through 6 although only two sets of transistor and electromagnet $Q_2$–SM2 and $Q_6$–SM6 are illustrated in FIG. 6a. Thus all the selection electromagnets are simultaneously energized whereby all the punches of the tape puncher are ready for punching the recording tape. Then the pulse $P_6$ slightly lagging with respect to the pulse $P_4$ energizes the punching electromagnet PM of the tape puncher 124 as previously described to cause the punches to punch a row of eight perforations on the leading edge of the recording tape followed by the tape stepping to the succeeding recording position.

Then a series of simulated operations of individual operators are successively determined in accordance with the programming tape and under control of the pulse $P_2$ and $P_4$.

After the sequence of scenes displayed onto the projection screen has ended to complete the series of tests, charts as shown in FIGS. 8a and 8b are distributed to the respective operators. Then each operator cuts the record tape away from his tape puncher and applies it in place on the chart to complete a list of results of tests. As shown in FIGS. 8a and 8b, the lower portion of the chart has printed thereon a transverse array of differently colored circles and a plurality of longitudinally elongated areas each having the same color as that circle aligned therewith. Also a series of the ordinal numbers starting with "one" are designated above the uppermost area to identify the test positions denoted on a map for the displayed sequence of scenes by the corresponding numbers printed also on the map. Dotted line extending along roads indicates a passageway along which a simulated vehicle traveled.

As previously described, the recording tape has a transverse array of perforations at the beginning thereof. Therefore each operator can glue his recorded tape on the chart such that both arrays of perforations coincide with each other and know the serial numbers of tests under which he erroneously operated the corresponding controls through reading of those ordinal numbers above the perforations in the respective elongated areas and also the traffic situations in which he made such errors through reading of the corresponding ordinal numbers printed on the map.

On the other hand, the projector continues to operate for a short period of time, after the last scene has terminated, to produce the 4.5 kc. pulse signals.

Each time the 4.5 kc. pulse signal occurs the feed electromagnets FM1 and 2 as shown in FIG. 6a are energized to move the programming tape by one step while at the same time the tape reader 124 provides a coded signal ABC$\overline{XYZVW}$ indicating the automatic transportation of the tape, in this way the programming tape will move a predetermined distance, for example, the total length of about 10 cm.

As shown in FIG. 5a the coded signal does not including a code for determining whether the particular operation performed by each operator is correct or wrong. Therefore during this automatic transportation of the programming tape any simulated operation that may be performed by each operator is ineffective for energizing the selection electromagnets with the result that the pulses $P_6$ causes the stepping movement of each recording tape without punching.

Then the recorded tapes each are cut away from their rolls and the programming tape is manually set to the succeeding starting position ready for succeeding series of tests.

The invention has several advantages. For example, the tested operators can readily known the types of controls erroneously operated by them and types of traffic situations in which they made such errors. As the slope effect is automatically introduced in each operator's station, it can be determined, for example, whether or not each operator applied the engine brake upon descent of his simulated vehicle. Also it can be determined whether or not a simulated operating speed was within a predetermined range of speeds as the case may be. Further the punched record tape can be particularly utilized for analysis.

While the invention has been illustrated and described in conjunction with a single preferred embodiment thereof it is to be understood that numerous changes in the details of construction and the combination and arrangement of parts without departing from the spirit and scope of the invention. For example, any suitable code system other than the eight unit code system may be combined with a programming tape. If desired, any suitable logic circuitry other than that illustrated may be used to decode the information read out from the programming tape. Also instead of NPN transfers, PNP transistors may be used with the polarity of the electric source revised from that illustrated.

What is claimed is:

1. An apparatus for the group test of individual operators in the operation of a plurality of controls in a motor vehicle, comprising, in combination:
    (a) a plurality of operator's stations each including a plurality of controls simulating those of an actual vehicle,
    (b) a central station including motion picture projection means for providing visual display for observation from the operator's stations, and means for imparting to each of said operator's stations the instruction for indicating the operation of a selected one of said controls in accordance with the specific display,
    (c) a speed voltage generator means at each of said operator's stations for calculating a simulated speed, and including means for introducing ascent and descent effects in calculating the simulated speed;
    (d) said means for imparting the instruction comprising signals having a predetermined frequency and successively stored along a length of motion picture film loaded in said projection means at selected locations, a programming medium having coded thereon the instructions indicating the operation of the controls, the upper and lower limits of speeds and the introduction of the ascent and descent effects, and means responsive to said signal to read the instruction out from said programming medium,
    (e) speed comparison means disposed at the central station one for each of the operator's stations,
    (f) operation determination means at each of said operator's stations for receiving the instructions indicating the operation of the controls to determine the erronous operation of the controls,
    (g) said speed comparison means responding to both the speed instruction and the simulated speed to compare the simulated speed with the instructed upper and lower limits of speed to produce an error signal when the simulated speed is not between the upper and lower limits, said error signal being supplied to said operation determination means; and
    (h) recording means at each of said operator stations including a record medium and responsive to errors in speed and the operation of the controls determined by the associated operation determination means to record the errors in said record medium at predetermined locations.

2. An apparatus as claimed in claim 1 wherein said predetermined frequency is of 4.5 kilocycles per second.

3. An apparatus as claimed in claim 1 wherein said speed comparison means include:
    (a) a digital-to-analog converter responsive to a speed instruction to provide the corresponding analog signal,
    (b) a function generator responsive to the analog signal to provide upper and lower limits of speeds prescribed by the speed instructed, and
    (c) a pair of comparator circuits, one of which is supplied with the upper limit of speeds and a simulated speed from the associated operator's station to provide an error signal when the simulated speed is above the upper limit of speeds, the other of which is supplied with the lower limit of speeds and the simulated speed to provide an error signal when the simulated speed is below the lower limit of speeds, the error signal being applied to the operation determination means for speed.

4. An apparatus as claimed in claim 1 wherein said operation determination means include:
    (a) a set of normal closed contacts responsive to the erroneous operation of the corresponding control to be open, and
    (b) means responsive to the instruction supplied thereto through the set of normally closed contacts to bring the recording medium into the corresponding predetermined location.

5. An apparatus as claimed in claim 1 wherein said recording means include a single tape puncher responsive to a pulse lagging behind a pulse representative of the instruction by a predetermined period of time to punch the record medium.

6. An apparatus as claimed in claim 1 wherein said speed voltage generator means include a speed capacitor having developed thereacross a voltage representative of a simulated speed and capable of being applied with a voltage in differential relationship with the first-mentioned voltage through a set of contacts closed when an ascent effect is to be introduced, and a voltage in additive relationship with the first-mentioned voltage through a set of contact closed when a descent effect is to be introduced.

References Cited

UNITED STATES PATENTS

| | | | |
|---|---|---|---|
| 2,628,434 | 2/1953 | Dehmel | 35—12 |
| 3,186,110 | 6/1965 | Smyth | 35—11 |
| 3,266,173 | 8/1966 | Sheridan | 35—11 |
| 3,266,174 | 8/1966 | Bechtol et al. | 35—11 |

WILLIAM H. GRIEB, Primary Examiner